E. KRATZ.
OPERATING KNIFE.
APPLICATION FILED FEB. 14, 1910.
990,882.
Patented May 2, 1911.
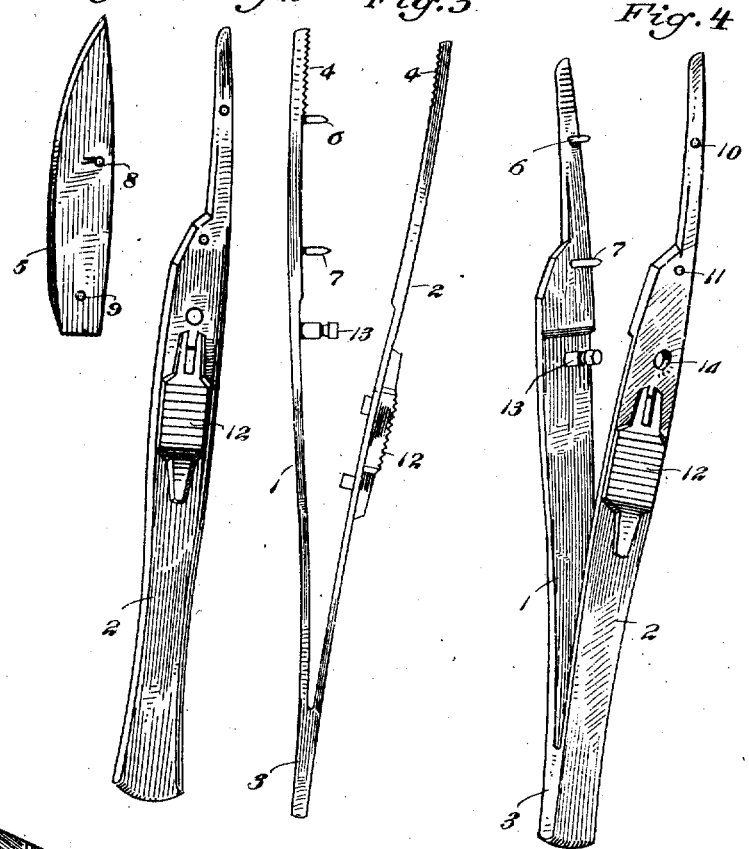
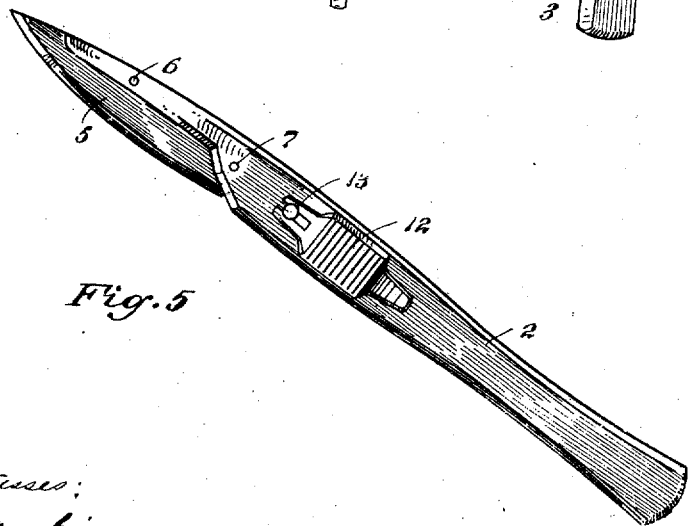

UNITED STATES PATENT OFFICE.

ERNST KRATZ, OF FRANKFORT-ON-THE-MAIN, GERMANY.

OPERATING-KNIFE.

990,882. Specification of Letters Patent. Patented May 2, 1911.

Application filed February 14, 1910. Serial No. 543,659.

*To all whom it may concern:*

Be it known that I, ERNST KRATZ, a subject of the King of Prussia, and a resident of Frankfort-on-the-Main, Germany, have invented certain new and useful Improvements in Operating-Knives, of which the following is a specification.

This invention relates to an implement particularly adapted for use by surgeons and comprising a knife or cutting blade and detachable handle, the latter being adapted for use as pincers or forceps.

Knives such as are commonly used by surgeons have heretofore generally been of two classes, one having a blade and handle rigidly secured or formed integral, and the other having a detachable blade with the handle adapted to form a sheath or receptacle therefor.

The implement herein described is superior to knives of the character just referred to, in that the blade may be readily removed and replaced so that blades of different shapes may be employed. The handle being adapted for use as pincers or forceps, also renders the implement of great utility as it in effect comprises two instruments.

In the accompanying drawings, Figure 1 is a perspective view of the blade detached; Fig. 2 is a side view of the handle; Fig. 3 is an edge view of the handle showing the members thereof separated; Fig. 4 is a perspective view of the handle member with the parts in the position shown in Fig. 3; and Fig. 5 is a perspective view showing the handle in its closed position engaging the blade.

The handle comprises two arms 1, 2 of spring metal, which are connected as at 3, so that the free ends thereof tend to constantly separate. Adjacent such free ends, the inner face of each arm is provided with a roughened or serrated surface 4. The blade 5 is adapted to be inserted between the arms 1, 2 and means are provided whereby said blade is positively locked with, or secured to the arms and prevented from turning between them. As shown the arm 1, has on its inner face two laterally projecting pins 6, 7, which are adapted to pass through openings 8, 9 in the blade 5, and into openings 10, 11 in the other arm 2 of the handle. It will be seen that each of the arms 1, 2 is reduced in width toward its free end so that the portions thereof immediately adjacent the blade are of less width than the blade whereby the latter projects sufficiently to provide a clear unobstructed cutting edge. The pins 6, 7 and apertures 8, 9 therefor, are so arranged that the plate is securely held against turning. The members of the handle are adapted to be held in their closed position and in close contact with the blade by means of a slide 12 mounted upon the arm 2, and adapted to engage a groove or recess formed in a pin 13, on the arm 1, which projects through an opening 14 in the arm 2 when the handle is in its closed position.

The advantages incident to such an implement as hereinbefore described will be readily apparent. It will be seen that the parts can be thoroughly cleaned and readily sterilized, that blades of different forms can be easily connected with or removed from the handle, and that the latter when separated from the blade will form an efficient pincers or forceps.

Having thus described the invention, what is claimed is:

1. The herein described surgical implement comprising a pair of pincers or forceps having resilient arms which are reduced in width toward their operative free ends, one of said arms having on its inner face a plurality of pins adapted to extend into engagement with the other arm when the arms are in closed position, a removable blade between the narrow end portions of said arms and having openings to receive two of said pins, and means for holding the arms in their closed position.

2. The herein described surgical instrument comprising a blade, a detachable handle, the latter including two normally separated arms adapted to receive the blade between them and provided with means for engaging it at a plurality of longitudinally separated points, the inner faces of the free ends of said arms being roughened to adapt said handle for use as pincers, and means adapted to lock the handle in engagement with the blade.

In testimony whereof I have signed my name to this specification in the presence of two subscribing witnesses.

ERNST KRATZ

Witnesses:
WILHELM KRATZ,
HUGO KRUMM.